D. M. BARR.
TIDE MOTOR.
APPLICATION FILED OCT. 1, 1908.
971,343.
Patented Sept. 27, 1910.
2 SHEETS—SHEET 2.
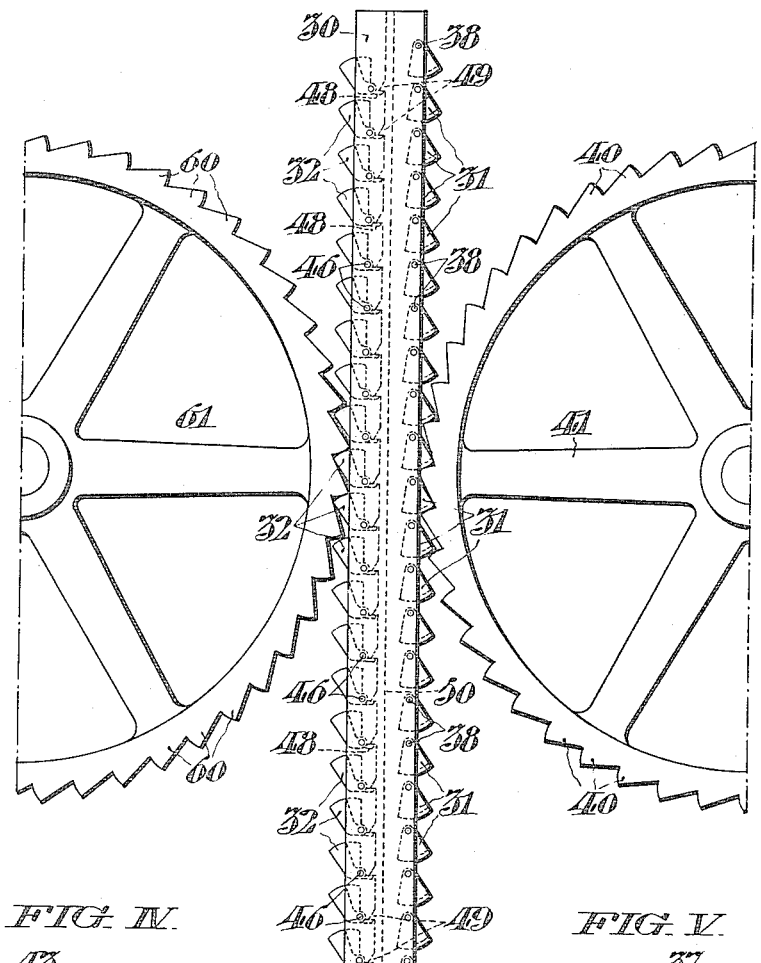
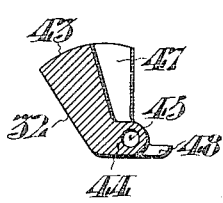
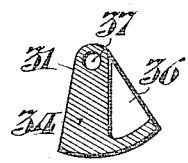
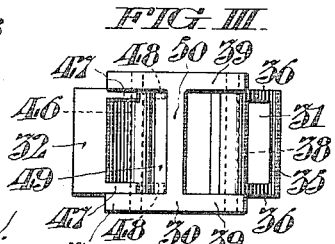
WITNESSES:
John C. Bergner
Wm. J. Sperl
INVENTOR:
DANIEL M. BARR,
by his Attorneys

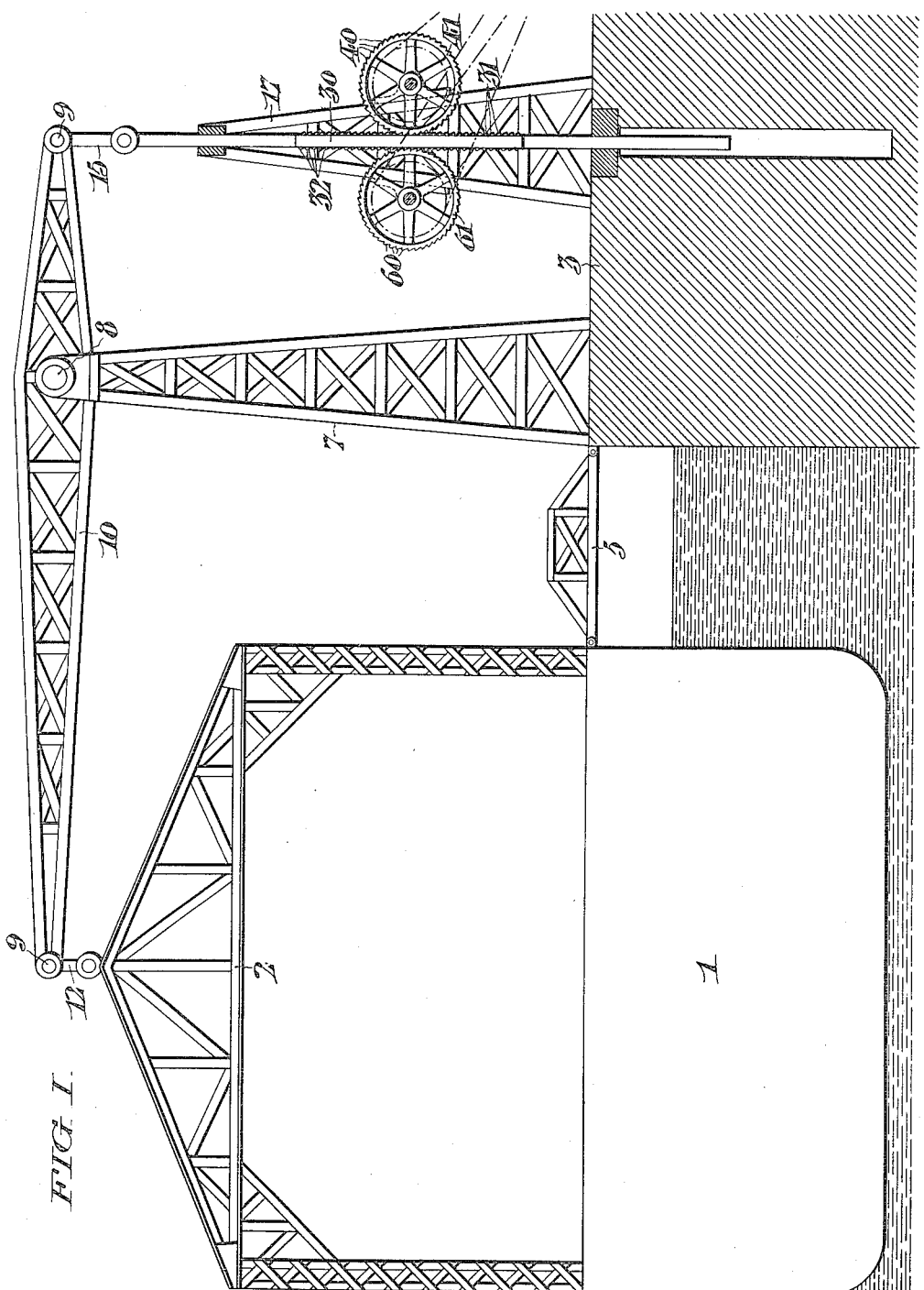

UNITED STATES PATENT OFFICE.

DANIEL M. BARR, OF PHILADELPHIA, PENNSYLVANIA.

TIDE-MOTOR.

971,343. Specification of Letters Patent. Patented Sept. 27, 1910.

Application filed October 1, 1908. Serial No. 455,714.

*To all whom it may concern:*

Be it known that I, DANIEL M. BARR, of Philadelphia, in the county of Philadelphia and State of Pennsylvania, have invented certain new and useful Improvements in Tide-Motors, of which the following is a specification, reference being had to the accompanying drawings.

My invention relates to mechanism designed to convert the rise and fall of tide water into a source of readily utilizable power, and to this end, consists of a reciprocating rod provided with a series of pivoted pawls, adapted to engage a plurality of large toothed wheels suitably geared to mechanism which may be driven thereby at increased speed. Said rod is suitably connected with a large float, whereby, during the upward motion of the rod, the pawls on one side are in driving position, and during the downward motion, the pawls on the other side are in driving position. If desired the wheels may be so connected to the driven mechanism, that it will always be turned in the same direction irrespective of which wheel is in active operation.

I will describe particularly the embodiments of my invention which I have illustrated, and which disclose suitable working apparatus for accomplishing the ends of my invention; but it will be understood that the invention is not limited to these particular embodiments, but is capable of other modifications, and that my claim of invention is not limited except as hereinafter pointed out in the claims appended to this specification.

In the accompanying drawings, Figure I, is an elevation showing my invention as applied to a float of well known construction. Fig. II, is a partial side elevation of the toothed wheels and the driving rod. Fig. III, is a horizontal section showing a convenient form of rod. Figs. IV, and V, are detail sectional views, on an enlarged scale, of the driving pawls.

I construct a large and stationary float 1, somewhat similar to those which are frequently used as landing stages in tidal waters. Upon this float is erected an arched structure 2, of sufficient size, strength, and height to form a strong attachment to the mechanism connections hereafter to be described, and also to leave the surface of the float free for other purposes, such for instance, as its use as a landing stage. The float 1, is attached to a bulk head 3, on the shore, by one or more suitable planks 5, provided with a hinged connection both to the bulk head and to the float, and preferably provided with side rails so as to be utilizable as gang planks. Upon the bulk head 3, is erected a standard 7, provided at its upper end with trunnions 8, for carrying the pivotal arms 9, of a large lever or beam 10, one end of which projects over and is pivotally attached to the super-structure 2, on the float 1, by means of a link 12, while the other end of the beam 10, is pivotally attached to a link 15. Link 15, is pivotally connected to the upper end of a rod 30, which is guided in suitable slideways mounted upon a supporting structure 17. Said rod may be conveniently formed of an I beam between the side flanges of which a series of pawls 31, and 32, may be pivotally mounted.

Each pawl 31, is substantially sector shaped in lateral cross-section, comprising a solid portion 34, having a cylindrical outer periphery which is continued by a flange or shelf 35, bounded on each end by a web 36. Said pawls are adapted to be suspended by rods 38, passing through holes 37, in their upper ends and secured in the flanges 39, of the I-beam and when so suspended the center of gravity of each pawl is below the pivotal point and the pawl therefore assumes the position shown in the drawing, so that the shelf 35, is in position to engage one of the teeth 40, on the wheel 41, when the rod 30, is moving downward to drive said wheel. When the rod is moving upward the pawls are tilted inwardly to slide by the teeth on the wheel.

Each pawl 32, is substantially L-shaped in lateral cross-section, comprising a solid tooth-engaging portion 43, and a laterally extending boss 44, having a hole 45, extending longitudinally therethrough by which the pawls may be pivotally supported upon rods 46, secured in the I-beam flanges 39. The ends of the pawl 32, comprise webs 47, which aid in strengthening it. Lugs 48, project from the boss 44, and are adapted to engage the under face of the teeth 49, on a rack which is formed on the web 50, of the rod 30.

It will be noted that the pawls 32, are in unstable equilibrium, and in order to prevent them from tilting outwardly too far, the lugs 48, are provided to engage with the teeth 49. When the rod 30, moves upwardly the pawls 32, are effective to engage the teeth 60, to drive the wheel 61. When said rod 30, moves downwardly the pawls tilt inwardly and glide by the teeth of the wheel 61. It will, therefore, be seen that the wheel 41, is driven during the downward movement of the rod 30, and the wheel 61, is driven during the upward movement of said rod. Said wheels may be of large diameter so that they may be geared down suitably for the mechanism to be driven thereby. The connections between said wheels and the driven mechanism may be such that said mechanism will always be driven in the same direction irrespective of the direction of movement of the rod 30, or separate mechanism may be connected to each wheel, as may be desired.

Having thus described my invention, I claim:

1. The combination of a float suitably attached to the shore of a tidal water; a pair of toothed wheels; a vertical reciprocatory rod having a plurality of series of pawls mounted thereon to coact with said wheels, one series being active to drive one of said wheels when said rod is moving downwardly and the other series being active to drive the other of said wheels when said rod is moving upward; and connections between said rod and float.

2. The combination of a float suitably attached to the shore of a tidal water; a pair of toothed wheels; a vertical reciprocatory rod having two series of pawls pivotally mounted thereon, one series being in stable equilibrium and the other series being in unstable equilibrium, and so related to said wheels that the first series operates to drive one wheel upon the downward movement of said rod, and the second series operates to drive the other wheel upon the upward movement of said rod.

In testimony whereof, I have hereunto signed my name, at Philadelphia, Pennsylvania, this—twenty-ninth—day of September, 1908.

DANIEL M. BARR.

Witnesses:
James H. Bell,
E. L. Fullerton.